United States Patent [19]
Mendell et al.

[11] Patent Number: 5,370,361
[45] Date of Patent: Dec. 6, 1994

[54] BUTTERFLY VALVE

[75] Inventors: Barry I. Mendell, Reading, Mass.; Leonard L. Marchland, Hudson, N.H.; Robert M. McElveen, Dracut, Mass.

[73] Assignee: The BOC Group, Inc., New Providence, N.J.

[21] Appl. No.: 232,558

[22] Filed: Apr. 25, 1994

[51] Int. Cl.$^5$ .............................................. F16K 1/22
[52] U.S. Cl. .................................... 251/307; 251/305; 251/308
[58] Field of Search ........................ 251/305, 307, 308

[56] References Cited

U.S. PATENT DOCUMENTS

| | | | |
|---|---|---|---|
| 2,913,218 | 11/1959 | Broz | 251/307 X |
| 4,146,206 | 3/1979 | Malloy et al. | 251/308 X |
| 4,214,731 | 7/1980 | Oota et al. | 251/308 X |

Primary Examiner—John C. Fox
Attorney, Agent, or Firm—David M. Rosenblum; Larry R. Cassett

[57] ABSTRACT

A butterfly valve comprising a valve body, a throttle plate located within a throat of the valve body, and opposed projecting pins connected to the throttle plate and extending into two opposed bores of the valve body. At least one pin has an annular bearing surface. A spring urges either a thrust bearing against a needle bearing which in turn bears against the annular bearing surface or a needle bearing against the thrust bearing to bear against the annular bearing surface. This urges the throttle plate against an opposed thrust bearing which bears against the opposed projecting pin connected to the throttle plate to center the throttle plate within the throat of the valve body. A set screw can be provided to accurately position the throttle plate within the throat of the valve body. Preferably the throttle plate has tapered end sections to diminish turbulence within the valve throat. Additionally, the throttle plate can be provided with end bores into which sections of the pins extend in a force fitting relationship.

11 Claims, 2 Drawing Sheets

BUTTERFLY VALVE

BACKGROUND OF THE INVENTION

The present invention relates to a butterfly valve having a throttle plate adapted to be rotated between open and closed positions within a throat of the valve. More particularly, the present invention relates to such a valve in which the throttle plate is centered by an adjustable thrust bearing acting against a spring loaded thrust bearing located on the opposite side of the throttle plate.

Butterfly valves are employed in many well known machines and devices for controlling flow conditions within a passageway. For instance, butterfly valves are employed for throttling purposes within an automotive carburetor. As another example, butterfly valves are employed for throttling purposes in connection with vacuum process chambers that are used to provide a pressure controlled manufacturing environment such as required in the manufacturing of semiconductors.

A butterfly valve comprises a throttle plate located within a throat of the valve. The throttle plate is rotatable between a closed position in which the throat of the valve is obstructed and an open position in which the throat is open. Generally, in the prior art, the throttle plate is attached to a rotatable shaft with screws. Rotation of the shaft rotates the throttle plate within the valve throat. In case of a vacuum process chamber, the screws can present a contamination hazard or an incompatibility with the process or process environment. In addition, the shaft and screws can produce turbulence in the flow. Although there are many different shaft mountings employed in the art, carbon filled, teflon bearings are often used where the butterfly valve is to undergo many cycles of operation. End plugs bear against the ends of the shaft to center the throttle plate within the valve throat. Such end plugs add to the complexity and expense involved in manufacturing the valve. Additionally, after repeated cycling of the valve, the end plugs tend to wear out. This is particularly critical for a butterfly valve used in a vacuum process chamber because the valve tolerances can be very tight, with very minute clearances between the throttle plate and valve throat.

As will be discussed the present invention provides a butterfly valve designed for simplicity and cost effectiveness in its construction and its maintenance.

SUMMARY OF THE INVENTION

The present invention provides a butterfly valve that comprises a valve body, a throttle plate, and a pivotable mounting means. The valve body has a throat and two opposed, coaxial bores in communication with the throat. The throttle plate is located within the throat of the valve body and is configured to be rotated within the throat between a closed position to obstruct the throat and an open position. In this regard, the throttle can be set in any position between the open and closed positions. In fact in a throttle in accordance with the present invention the set point of the throttle plate can have a resolution of about 0.1 degrees. The pivotable mounting means pivotably mount the throttle plate within the throat of the valve body so that it is centered within the valve body.

The pivotable mounting means has first and second axle-like portions connected to the throttle plate so as to rotate with the throttle plate and to extend into the two bores of the valve body. The first and second axle-like portions have first and second bearing surfaces, respectively. First and second bearing means are located within the two opposed bores of the valve body, respectively, for rotatably supporting the first and second projecting portions within the two opposed, coaxial bores. First and second thrust bearings are provided. Each of the first and second thrust bearings have bearings captured between annular races. The first and second thrust bearings, respectively, act against the first and second bearing surfaces to center the throttle plate within the throat of the valve. It is important to note that such action may or may not be "direct" action. For instance, the first and second thrust bearings may act directly against the bearing surfaces or against the first and second bearing means which in turn may contact the bearing surfaces. The claims are intended to cover such alternate direct and indirect actions of the thrust bearings. A means is provided for urging either the first thrust bearing against the first bearing means or the first bearing means against the first thrust bearing so that either the first bearing means or the first thrust bearing bears against the first bearing surface and in turn urges the first and second projecting portions and the throttle plate toward the second thrust bearing. An adjustment means is connected to the valve body for adjusting the position of the second thrust bearing within the valve body and therefore, the throttle plate to center the throttle plate within the throat of the valve body. As used herein and in the claims, the term "center" means to adjust the position of the throttle plate within the throat so that proper clearance is obtained between the edges of the throttle plate and the boundaries of the throat.

The locating of the butterfly valve between two thrust bearings eliminates the use of end plugs and further, allows for the centering of the throttle plate within the valve throat within very close tolerances. The ball-bearing-type of thrust bearings have low wear characteristics to allow a butterfly valve constructed in accordance with the present invention to operate for long periods without the loss of required close tolerances between moving parts incorporated into the design of the valve.

BRIEF DESCRIPTION OF THE DRAWINGS

While the specification concludes with claims distinctly pointing out the subject matter that Applicants regard as their invention, it is believed that the invention will be better understood when taken in connection with the accompanying figures in which:

DETAILED DESCRIPTION

Figure 1:
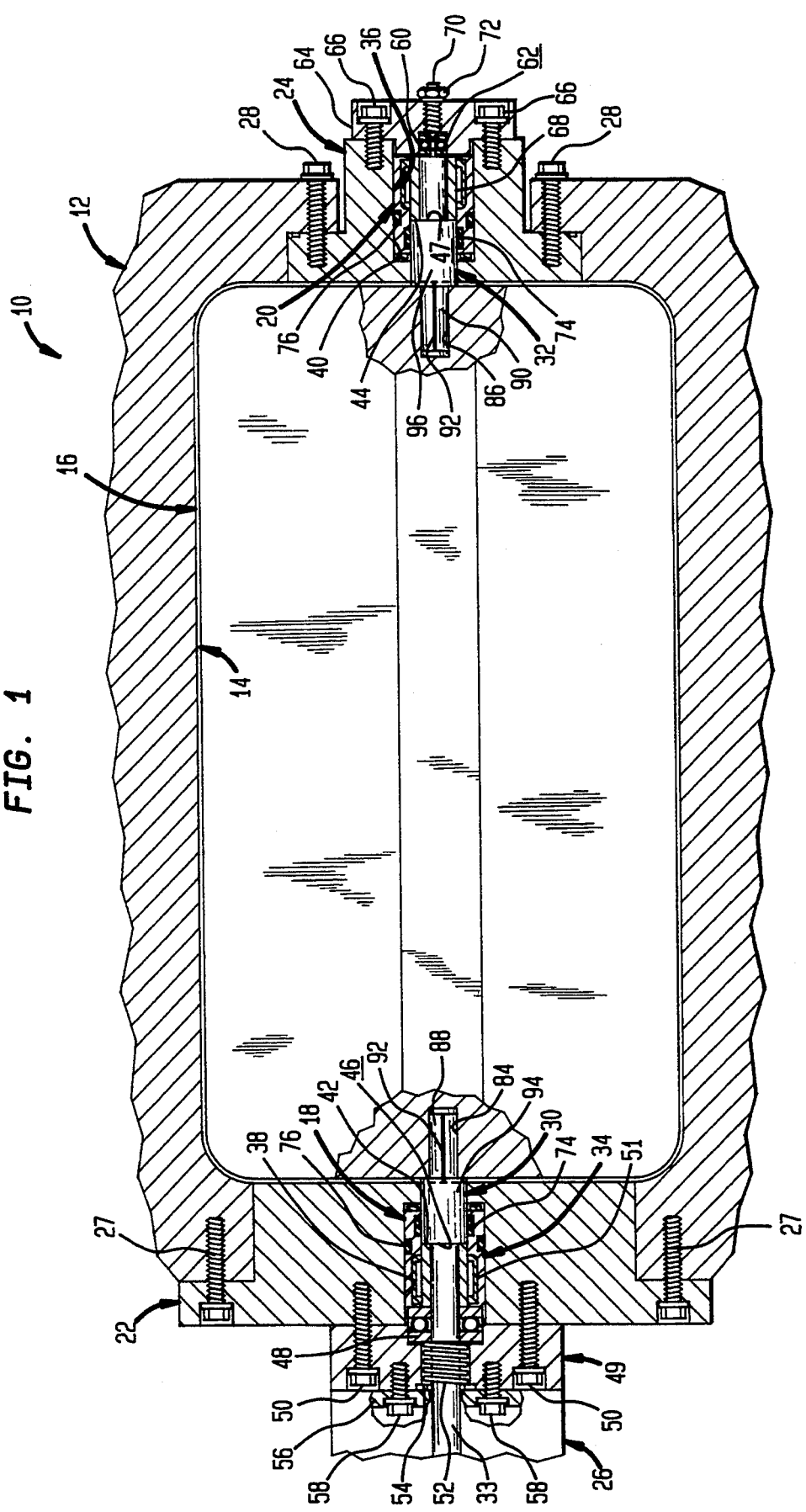
FIG. 1 is a fragmentary, plan view of a butterfly valve in accordance with the present invention with portions of the valve body and valve plate broken away in order to illustrate internal construction.

With reference to FIG. 1, a butterfly valve 10 in accordance with the present invention is illustrated. Butterfly valve 10 includes a valve body 12 having a throat 14. A throttle plate 16 is located within throat 14 of valve body 12. Throttle plate 16 is rotatable within throat 14 between an illustrated closed position to obstruct throat 14 and an open position in which throttle plate 16 is rotated approximately 90° from the position shown in the illustration; and anywhere between such positions. Throttle plate 16 is pivotably mounted by provision of bearing assemblies 18 and 20 extending into bearing blocks 22 and 24. Throttle valve 16 can be rotated by means of a stepper motor, not illustrated. Part of the mounting of and the drive for the stepper motor is designated by reference numeral 26.

In the illustrated embodiment, valve body 12 is a portion of a vacuum process chamber in which bearing blocks 22 and 24 are attached to the process chamber by means of bolts 27 and 28. It is understood that the present invention would have equal applicability to a valve body built in one piece with bearing blocks 22 and 24 and valve body 12 being of one-piece construction. The present invention has further applicability to a valve that is designed to be attached to equipment as a separate component.

Axle-like portions of the mounting of throttle plate 16 are preferably formed by pins 30 and 32. Pins 30 and 32 are connected to and rotate with throttle plate 16 and extend into bores 34 and 36 defined within bearing blocks 22 and 24. Bores 34 and 36 respectively have enlarged portions 38 and 40 to receive bearing assemblies 18 and 20. Pin 30 has an elongated shaft portion 33 that is designed to be connected to a pulley carrying a ribbed belt also running through a pulley connected to the drive shaft of the stepper motor. The present invention has equal applicability to the use of a rotatable shaft in which the end portions of such shaft serve the same purpose as pins 30 and 32 by forming the relevant axle-like portions of the mounting of throttle plate 16. It is to be noted that the use of a rotatable shaft is less preferred in that the shaft, at its connection with the throttle plate, can produce turbulence and as mentioned above, the use of screws can present compatibility problems.

Each pin 30, 32 has a stepped configuration or a shoulder (shoulder 42 of pin 30 and shoulder 44 of pin 32) to provide an annular bearing surface 46 for pin 30. An annular bearing surface 47 is also provided for pin 32 which in the illustrated embodiment is not used in the same manner as annular bearing surface 46 associated with pin 30.

Bearing assembly 18 is provided with a thrust bearing 48 having ball bearings captured between annular races so that the elongated shaft-like portion 33 of pin 30 can extend through thrust bearing 48. Thrust bearing 48 is held in position by end cap 49 which is attached to bearing block 22 by bolts 50. Thrust bearing 48 bears against a needle bearing 51 (rotatably supporting pin 30) which in turn bears against annular bearing surface 46 of pin 30. Preferably, the requisite force is provided by a helically wound spring 52 acting against thrust bearing 48 which in turn bears against needle bearing 51. Needle bearing 51 acts directly against bearing surface 46 of pin 30. A possible alternative embodiment in accordance with the present invention is to position thrust bearing 48 directly against bearing surface 46 so that spring 52 acts against needle bearing 51 which in turn acts against thrust bearing 48. Spring 52 is set in compression by a washer 54 held against spring 52 by an annular end plate 56. End plate 56 is in turn attached to end cap 49 by bolts 58.

Bearing assembly 20 is provided with a thrust bearing 60 also having ball bearings captured between annular races. Thrust bearing 60 is, however, sized smaller than thrust bearing 48 to bear against pin 32 which provides a circular end surface 62 on which thrust bearing 60 acts in opposition to the force provided by spring 52. Thrust bearing 60 is held in position by end cap 64 which is attached to bearing block 24 by bolts 66. A needle bearing 68 is provided to rotatably support pin 32. As can be appreciated, as an alternative embodiment bearing assembly 20 could be fabricated in the manner of bearing assembly 18 so that thrust bearing 60 bore against needle bearing 68 which in turn would bear against annular bearing surface 47 provided for pin 32. In such case, thrust bearing 60 would have to be sized similarly to thrust bearing 48.

In order to accurately position throttle plate 16 with throat 14, a set screw 70 is provided which can be locked in place with lock nut 72. Set screw 70, at its pointed end, bears against thrust bearing 60 and therefore, pin 32, to accurately position of throttle plate 16. In the illustrated embodiment, the clearance between throttle plate 16 and throat 14 is about 0.5 mm.

Each of the bearing assemblies 18 and 20 incorporate 'O' rings 74 to provide a shaft seal for pins 30 and 32 and an outer 'O' ring 76 to provide a seal between bearing assemblies 18 and 20 and valve body 12.

Figure 3:
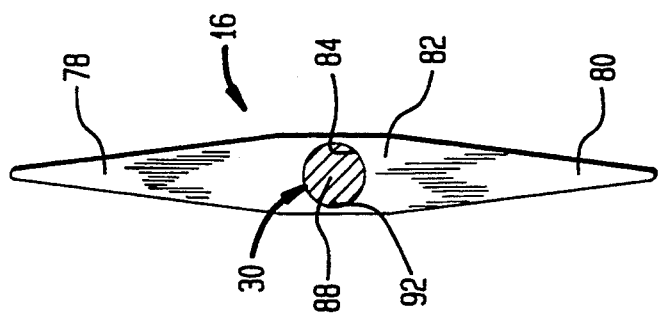
FIG. 3 is a sectional view of the throttle plate used in the butterfly valve of FIG. 1.
Figure 2:
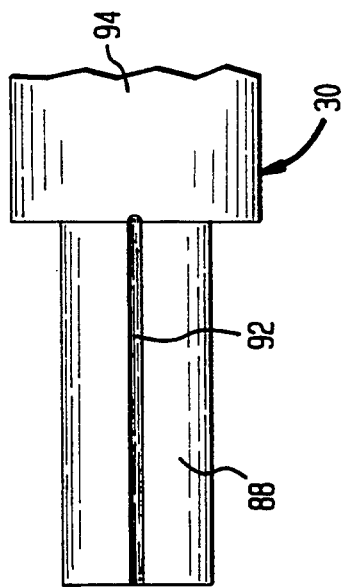
FIG. 2 is an enlarged fragmentary view of a pin used in mounting a throttle plate of the butterfly valve shown in FIG. 1.

With reference to FIGS. 2 and 3, throttle plate 16 can be seen to have opposed tapered end sections 78 and 80 connected by a root section 82 thereof. This construction is preferred because it eliminates turbulence within throat 14 that would otherwise exist with bearing plate shaft arrangements in which throttle plates are attached to rotatable shafts. Additionally, throttle plate 16 is also provided with opposed, axially oriented endbores 84 and 86, into which narrow sections 88 and 90 of pins 30 and 32 project. Connection is effected by a force fit in which pins 30 and 32 are placed in a liquid nitrogen bath and then inserted into end bores 84 and 86. Upon warming, expansion of narrow sections 88 and 90 of pins 30 and 32 effect a connection. In order to prevent gases, for instance, nitrogen from being trapped within endbores 84 and 86, each of pins 30 and 32 has defined, in its narrow section (88,90) thereof, a longitudinally extending groove 92. In order for such grooves 92 to allow gas to escape from end bores 84 and 86, grooves 92 extend in a normal direction within enlarged sections 94 and 96 of pins 30 and 32.

While the present invention has been described in reference to a preferred embodiment, it will be understood by those skilled in the art that numerous changes, omissions, and additions may be made without departing from the spirit and scope of the present invention.

We claim:

1. A butterfly valve comprising:
    a valve body having a throat and two opposed, coaxial bores in communication with said throat;
    a throttle plate located within said throat of said valve body configured to be rotated within said throat between a closed position to obstruct said throat and an open position; and
    pivotable mounting means for pivotably mounting said throttle plate so that it is centered within said throat of said valve body,
    said pivotable mounting means having,
        first and second opposed axle-like portions connected to said throttle plate so as to rotate with said throttle plate and to extend into said two bores of said valve body, said first and second axle-like portions having first and second bearing surfaces, respectively;

first and second bearing means located within said two opposed bores of said valve body, respectively, for rotatably supporting said first and second axle-like portions within said two opposed, coaxial bores;

first and second thrust bearings each having bearings captured between annular races, said first and second thrust bearings respectively acting against said first and second bearing surfaces to center said throttle plate within said throat:

means for urging either said first thrust bearing against said first bearing means or said first bearing means against said first thrust bearing so that either said first bearing means or said first thrust bearing directly bears against said annular bearing surface and in turn urges said first and second axle-like and said throttle plate toward said second thrust bearing; and adjustment means connected to said valve body for adjusting the position of said second thrust bearing within said valve body and therefore, said throttle plate to center said throttle plate within said throat of said valve body.

2. The butterfly valve of claim 1, wherein said first axle-like portion of said pivotable mounting means has a shoulder to form said first bearing surface.

3. The butterfly valve of claim 1, wherein said first bearing means is located between said first thrust bearing and said first bearing surface.

4. The butterfly valve of claim 1, wherein said adjustment means comprises a set screw centrally and directly acting against said second thrust bearing.

5. The butterfly valve of claim 1, wherein:

said throttle plate has two opposed, axially oriented end bores;

said axle-like portions comprise two pins located within said axial end bores and connected to said throttle plate by a shrink fit; and each of said pins has an axial extending groove to prevent gas from being trapped between said pins and said axial end bores.

6. The butterfly valve of claim 1, wherein each of said first and second axle-like portions of said pivotable mounting means has a shoulder to form said first bearing surface on said first axle-like portion and said second axle-like portion has an end surface to form said second bearing surface.

7. The butterfly valve of claim 6, wherein said first bearing means is located between said first thrust bearing and said first bearing surface.

8. The butterfly valve of claim 7, wherein each of said first and second bearing means comprises a needle bearing.

9. The butterfly valve of claim 8, wherein:

said urging means comprises a helically wound spring set in compression and acting against said first thrust bearing;

said butterfly valve further comprises said valve body having a threaded bore located adjacent said second thrust bearing and a set screw threaded within said threaded bore and centrally acting against said second thrust bearing.

10. The butterfly valve of claim 9, wherein:

said throttle plate has two opposed, axially oriented end bores;

said first and second axle-like portions comprise two pins located within said axially oriented end bores and connected to said throttle plate by a shrink fit; and each of said pins has an axially extending groove to prevent gas from being trapped between said pins and said axial end bores.

11. The butterfly valve of claim 10, wherein:

said throttle plate has opposed tapered end sections connected by a root section to decrease turbulence within said throat of said valve body; and said opposed, axially oriented end bores are defined in said root section.

* * * * *